United States Patent
Koumura et al.

(10) Patent No.: US 7,619,333 B2
(45) Date of Patent: Nov. 17, 2009

(54) VEHICLE ALTERNATOR WITH IMPROVED OPERATION RELIABILITY

(75) Inventors: Masatoshi Koumura, Okazaki (JP); Yoshiki Tan, Anjo (JP); Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/878,541

(22) Filed: Jul. 25, 2007

(65) Prior Publication Data

US 2008/0061640 A1    Mar. 13, 2008

(30) Foreign Application Priority Data

Sep. 7, 2006    (JP)    .............. 2006-242905

(51) Int. Cl.
*H02K 1/32*    (2006.01)
(52) U.S. Cl. .......................... 310/64; 310/58
(58) Field of Classification Search ................... 310/62, 310/64, 68 D
See application file for complete search history.

(56) References Cited

U.S. PATENT DOCUMENTS

| | | | |
|---|---|---|---|
| 5,710,467 A * | 1/1998 | Irie et al. ...................... | 310/64 |
| 5,949,166 A | 9/1999 | Ooiwa et al. | |
| 6,160,335 A * | 12/2000 | Ishida et al. ............... | 310/68 D |
| 6,184,602 B1 | 2/2001 | Ooiwa et al. | |
| 6,903,472 B2 * | 6/2005 | Ogi ........................... | 310/68 D |
| 7,196,441 B2 * | 3/2007 | Ueda et al. ..................... | 310/64 |

FOREIGN PATENT DOCUMENTS

JP    A 11-164538    6/1999

\* cited by examiner

*Primary Examiner*—Nguyen N Hanh
(74) *Attorney, Agent, or Firm*—Oliff & Berridge, PLC

(57) ABSTRACT

A vehicle alternator is disclosed having a stator, a rotor, a frame surrounding the stator and the rotor, a bowl-shaped end cover mounted on the frame and defining an electric component-part compartment, a brush unit held in sliding contact with slip rings of a rotary shaft, and a rectifier unit. The rectifier unit includes an insulating terminal block radially extending in face-to-face relation to the one end face of the frame, a positive-side cooling fin carried on one surface of the insulating terminal block, and a negative-side cooling fin carried on the other surface of the insulating terminal block. At least one of the insulating terminal block and the end cover has a heat shield plate member laterally extending through a radial space between the cooling fins and the brush unit in a direction substantially parallel to the axis of the rotary shaft.

5 Claims, 3 Drawing Sheets

VEHICLE ALTERNATOR WITH IMPROVED OPERATION RELIABILITY

CROSS REFERENCE TO RELATED APPLICATIONS

This application is related to Japanese Patent Application No. 2006-242905, filed on Sep. 7, 2006, the content of which is hereby incorporated by reference.

BACKGROUND OF THE INVENTION

1. Technical Field of the Invention

The present invention relates to vehicle alternators and, more particularly, to a vehicle alternator having a brush unit formed in a degradation-minimizing structure.

2. Description of the Related Art

With vehicle alternators of the related art, it has been a usual practice to include a rectifier unit and a brush unit disposed along an axis of a rotary shaft in an overlapping relationship. The rectifier unit includes a horseshoe-shaped cooling fan radially extending and fixedly carrying thereon rectifying elements. Under such a structure, the cooling fan has a radially inward end placed in close proximity to an outer periphery of the brush unit.

An attempt has heretofore been made to provide a vehicle alternator structured to have a rectifier unit, fixedly supported on an external surface of a frame, which is covered with an end cover as disclosed in U.S. Pat. No. 6,184,602. The end cover has cooling windows admitting cooling airflows for cooling the rectifier unit.

With an ongoing progress in recent years on development of vehicle alternators each with a minimized structure at an increased power output, an issue arises with the occurrence of a less clearance between a largely sized rectifier unit and a brush unit. However, a cooling fan, reaching a high temperature, provides a radiation heating to the brush unit placed in close proximity to the cooling fan. This causes an increase in temperatures of brushes inside the brush unit. The increase in brush temperatures results in an increase in electrical resistances of the brushes, leading to the occurrence of the brushes being heated. This results in early wears of the brushes while causing a reduction in excitation current. This might be addressed by placing the cooling fin and the brush unit away from each other. However, this results in an increase in a physical size of the vehicle alternator.

SUMMARY OF THE INVENTION

The present invention has been completed with a view to addressing the above issues and has an object to provide a vehicle alternator that can prevent an increase in physical size while minimizing a heat transfer from a cooling fin to a brush unit.

To achieve the above object, a first aspect of the present invention provides a vehicle alternator comprising a stator having a stator winding, a rotor having a field winding, a rotary shaft to which the rotor is fixedly mounted and carrying thereon slip rings, a frame surrounding the stator and the rotor, a bowl-shaped end cover covering an end face of the frame and defining an electric component-part compartment together with the end face of the frame for accommodating the slip rings carried on the rotary shaft, a brush unit held in sliding contact with the slip rings in the electric component-part compartment, and a rectifier unit accommodated in the electric component-part compartment on a radial plane in opposition to the brush unit with respect to an axis of the rotary shaft. The rectifier unit includes an insulating terminal block radially extending in face-to-face relation to the one end face of the frame, a positive-side cooling fin carried on one surface of the insulating terminal block, and a negative-side cooling fin carried on the other surface of the insulating terminal block. At least one of the insulating terminal block and the end cover has a heat shield plate member laterally extending through a radial space between the cooling fins and the brush unit in a direction substantially parallel to the axis of the rotary shaft.

With the vehicle alternator set forth above, at least one of the insulating terminal block and the end cover has the heat shield plate member laterally extending through a radial space between the cooling fins and the brush unit in a direction substantially parallel to the axis of the rotary shaft.

With such a structure, the heat shield plate member can block a radiation heat from the cooling fins to the brush unit, thereby enabling the suppression of an increase in temperature of the brush unit. Further, the heat shield plate member has a capability of precluding water droplets, entered the electric component-part compartment from an outside, from reaching the brush unit. This prevents the water droplets from entering an inside of the brush unit, thereby minimizing progressive wears of the brushes.

In a preferred embodiment, the heat shield plate member may be preferably made of resin and integrally formed with at least one of the insulating terminal block and the end cover. Such an arrangement ensures a reduction in production cost while realizing the advantageous effects mentioned above.

In another preferred embodiment, the heat shield plate member includes first and second heat shield plate portions provided on the insulating terminal block and the end cover, respectively, and the first and second heat shield plate portions laterally extend in an overlapped relationship with a given radial space.

In another preferred embodiment, the first heat shield plate portion may be preferably placed in an area between one of the cooling fins and the brush unit and extend from the insulating terminal block in the direction substantially parallel to the axis of the rotary shaft, and the second heat shield plate portion may be preferably placed in the area between the one of the cooling fins and the brush unit so as to extend from the end cover in a position radially outward the first heat shield plate portion of the insulating terminal block. Such a structure enables improvements in a heat shield effect of the brush unit and a waterproof effect of the brush unit.

In another preferred embodiment, the end cover may preferably have a plurality of cooling airflow windows, and the electric component-part compartment may preferably have a cooling airflow passage in fluid communication with the cooling airflow windows to admit cooling airflows from the cooling airflow windows in contact with the cooling fins. With such a structure, the brush unit can have improved heat shield effect while enabling the realization of an increase in cooling capability of the brushes in the flow of cooling winds. In addition, the cooling fins can be cooled at the radially inward ends with increased cooling efficiency.

In another preferred embodiment, the heat shield plate member may be preferably formed in at least one of the insulating terminal block and the end cover and held in tight contact with the other one of the insulating terminal block and the end cover. With such a structure, the brush unit can have improved heat shield effect and waterproofing effect.

In another preferred embodiment, the end cover may preferably have a plurality of cooling airflow windows, and the terminal block may preferably have a through-hole in fluid communication with the cooling airflow windows for admitting cooling airflows from the cooling airflow windows to the frame in an area inside the electric component-part compartment along the heat shield plate member. With such a structure, the radially inward ends of the cooling fins can be cooled at increased efficiencies.

DETAILED DESCRIPTION OF PREFERRED EMBODIMENTS

Figure 1:
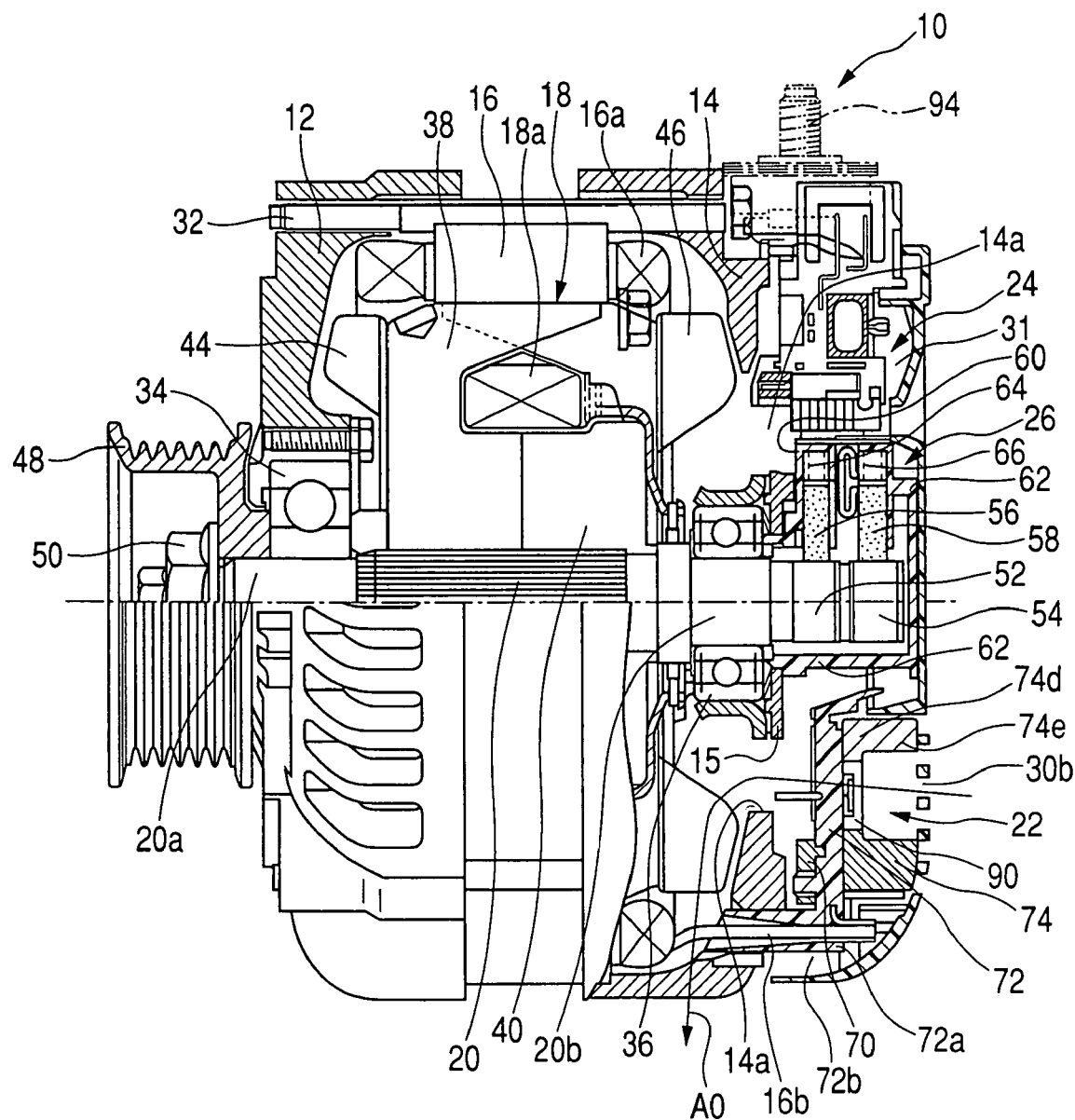
FIG. 1 is a longitudinal cross sectional view of a vehicle alternator of a first embodiment according to the present invention.

Now, vehicle alternators of various embodiments according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, like reference characters designate like or corresponding component parts throughout the several views. Also in the following description, it is to be understood that such terms as "front", "rear", "parallel", "radial", "axial", "axially", "rotational", "inward", "outside", "downward", "toward" and the like are words of convenience and are not to be construed as limiting terms.

First Embodiment

A vehicle alternator of a first embodiment according to the present invention will be described below in detail with reference to FIGS. 1 to 3 of the accompanying drawings.

FIG. 1 is a longitudinal cross sectional view showing an overall structure of the vehicle alternator of the first embodiment implementing the present invention.

Figure 2:
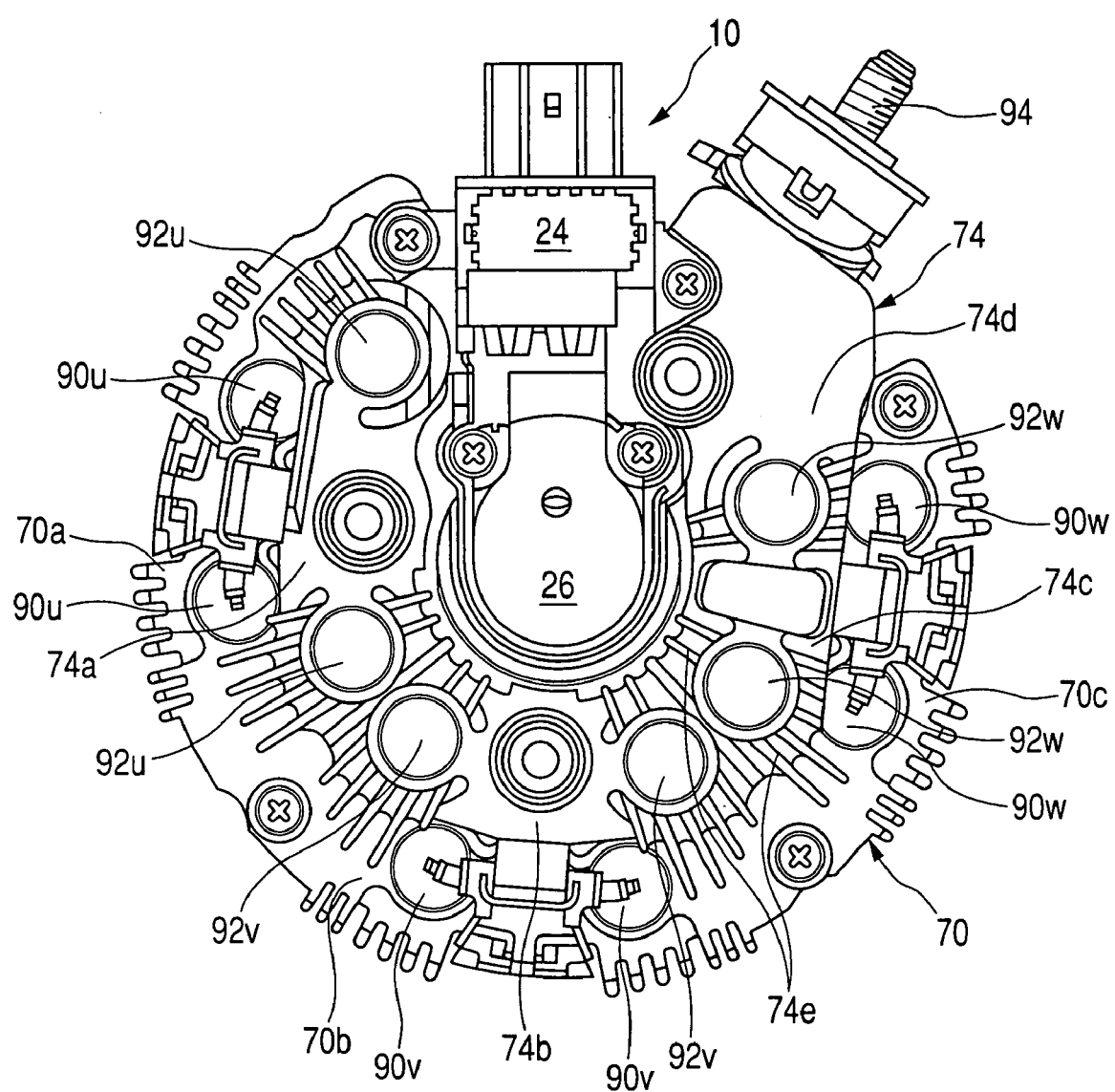
FIG. 2 is a rear view of the vehicle alternator with a rectifier unit as viewed on a rear side of the vehicle alternator shown in FIG. 1.

FIG. 2 is a rear view showing a rear side of the vehicle alternator shown in FIG. 1.

Figure 3:
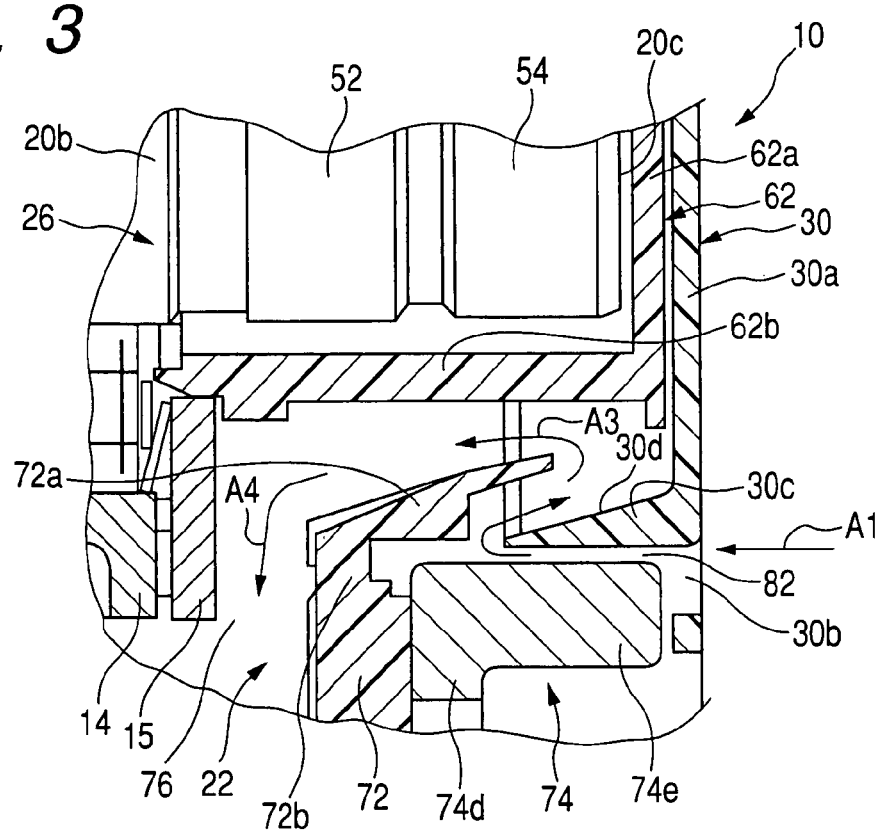
FIG. 3 is a fragmentary enlarged view showing an insulating terminal block and an end cover with featured structures of the first embodiment.

FIG. 3 is a view showing a featuring structure of the vehicle alternator of the first embodiment.

[Overall Structure]

As shown in FIG. 1, the vehicle alternator 10 includes a front frame 12, a rear frame 14, a stator 16 supported with the front and rear frames 12, 14 and having a stator coil 16a for generating an A.C. power output, a Lundell-type rotor 18, carried on a rotary shaft 20 rotatably supported with the front and rear frames 12, 14, which is rotatably disposed inside the stator 16, a rectifier unit 22 for converting A.C. power output, generated by the stator coil 16a, into D.C. power output, a voltage regulator 24 regulating D.C. power output, rectified by the rectifier unit 22, at a desired output voltage, and a brush unit 26 for supplying excitation current to a field winding 18a via slip rings 52, 54 carried on the rotary shaft 20, and a bowl-shaped end cover 30 fixedly secured to the rear frame 14 for defining an electric component-part compartment 31 for accommodating therein electric devices including the rectifier unit 22, the voltage regulator 24 and the brush unit 26. The bowl-shaped end cover 30 is made of resin by forming and has a bottom wall 30a formed with a large number of cooling airflow windows 30b for admitting cooling airflows from the outside.

Both the front and rear frames 12, 14 are tightened to each other by means of a plurality of through-bolts 32 with the stator 16 being sandwiched in an axial direction. The front and rear frames 12, 14 carry thereon front and rear bearings 34, 36, which rotatably support the rotary shaft 20 to allow the Lundell-type rotor 18 to be rotatable within an inner periphery of the stator 16. The front and rear bearings 34, 36 are fixedly supported on the front and rear frames 12, 14, respectively.

The stator 16, fixedly supported with the front and rear frames 12, 14, includes the stator coil 16a composed of, for instance, a three phase winding to generate, for instance, a three-phase AC voltage. The rotor 18 includes front and rear pole cores 38, 40, carrying thereon the field winding 18, which are fixedly supported on the rotary shaft 20.

In addition, the rotary shaft 20 has a front-end 20a, on which a pulley 48 is fixedly mounted by means of a nut 50, to be rotatably driven with output torque of an engine (not shown) of a vehicle. Moreover, the rotary shaft 20 has a rear end portion 20b extending through the rear frame 14 to an area outside thereof and carries thereon the slip rings 52, 54 at given axially spaced positions. The slip rings 52, 54 are electrically connected to both ends of the field winding 18a, respectively.

As shown in FIG. 1, an insulating terminal block 72 is fixedly supported on the rear frame 14 at a rear end face thereof on substantially the same radial plane as the brush unit 26 in opposition thereto in a radial direction. The insulating terminal block 72 has a front surface carrying thereon a negative-side cooling fin 70 and a rear surface carrying thereon a positive-side cooling fin 74 with ensured electrical insulation distance between the negative-side cooling fin 70 and the positive-side cooling fin 74. The insulating terminal block 72 also has a function to fixedly retaining alternating current wiring metal segments.

Centrifugal type front and rear cooling fans 44 and 46 are fixedly mounted on the front and rear pole cores 38, 40 and include mixed flow fans that have a plurality of fan blades tilted forward with respect to a rotational direction of the rotor 18 for the purpose of flowing cooling winds toward the stator coil 16a.

During rotations of the cooling fans 46, cooling airflows are drawn through cooling airflow intake ports 14a, formed in the rear frame 14, and the cooling airflow windows 30b, formed in the end cover 30, to insides of the front and rear frames 12, 14 in a direction as shown by an arrow A0 in FIG. 1. In this moment, the cooling airflows are directed in an axial and centrifugal direction, thereby cooling the stator coil 16a.

The vehicle alternator 10 of the present embodiment has the same structure as that of a usual vehicle alternator and operates in the same manner as that of the usual vehicle alternator. Therefore, the vehicle alternator 10 of the present invention will be described below further in detail with a focus on unique features of the present invention.

(Brush Unit 26)

The brush unit 26 includes a pair of brushes 56, 58 operatively held in sliding contact with the slip rings 52, 54, respectively, carried on the rear end 20b of the rotary shaft 20, a brush holder 60 having a brush accommodating section for accommodating therein the brushes 56, 58, and a sealing plate member 62 for sealing a lower part of the brush holder 60 while covering outer peripheries of the slip rings 52, 54. The brush accommodating section accommodates therein springs 64, 66 with which the brushes 56, 58 are urged downward into sliding contact with the slip rings 52, 54, respectively. The brush holder 60 and the sealing plate member 62, both of which are made of resin, are unitized in structure to surround the outer circumferential periphery and a rear end face 20c of the rotary shaft 20.

The brush holder 60 includes, in addition to the rectangular-shape brush accommodating section individually accommodating the brushes 56, 58 and opened downward, and a slip ring accommodating section extending downward from a bottom portion of the brush accommodating section for internally encompassing nearly upper half areas of the rear end portion 20b of the rotary shaft 20 and the slip rings 52, 54. The slip ring accommodating section has sidewalls, disposed on both sides of the slip rings 52, 54 and extending in directions parallel to a radial direction of the rotary shaft 20, and a rear end wall remote from the rear end face 20c of the rotary shaft 20 by a given distance in an axial direction and extending downward in the direction parallel to the radial direction of the rotary shaft 20.

As shown in FIGS. 1 and 2, the sealing plate 62 has sidewalls, placed on both lateral sides of the slip rings 52, 54 and upwardly extending in directions parallel to the radial direction of the rotary shaft 20, a rear end wall 62a axially spaced from the rear end face 20c of the rotary shaft 20 by a given distance and extending in a direction perpendicular to an axis of the rotary shaft 20, and a bottom wall 62b laterally extending from lower ends of the sidewalls of the sealing plate 62 and a lower end of the rear end wall 62a. The sealing plate 62 is tightly fitted to the brush holder 60 to be unitized with the slip ring accommodating section of the brush holder 60, thereby forming the slip ring accommodating section for encompassing the rear end 20b of the rotary shaft 20 and the slip rings 52, 54.

(Rectifier Unit 22)

The rectifier unit 22 includes the negative-side cooling fin 70, made of horseshoe-shaped metal, and the positive-side cooling fin 74, made of horseshoe-shaped metal, which are fixedly mounted on the insulating terminal block 72 on both sides thereof. The insulating terminal block 72 is composed of a resin-mold product embedded with insert-molded alternating-current wiring metal segments. The terminal block 72 is located in a lower area 76 beneath the sealing plate 62. In addition, the terminal block 72 has a radially outward end portion 72a formed with laterally extending tubular portion 72b fixedly connected to and supported with the rear frame 14. The negative-side cooling fin 70 and the positive-side cooling fin 74 are placed on the terminal block 72 at both sides thereof in a stacked structure. The positive-side cooling fin 74 is electrically insulated from the rear frame 14 and the negative-side cooling fin 70. In an alternative, the positive-side cooling fin 74 and the negative-side cooling fin 70 may be supported on the front and rear end faces of the terminal block 72.

As shown in FIG. 2, the negative-side cooling fin 70 has first to third mounting areas 70a to 70c formed in circumferentially spaced positions for fixedly supporting a first pair of U-phase diodes 90u, a second pair of V-phase diodes 90v and a third pair of W-phase diodes 90w, respectively. Likewise, the positive-side cooling fin 74 has first to third mounting areas 74a to 74c formed in circumferentially spaced positions for fixedly supporting a first pair of U-phase diodes 92u, a second pair of V-phase diodes 92v and a third pair of W-phase diodes 92w, respectively.

Under such structures, negative-electrode diodes 90u, 90v, 90w have cathode electrode leads electrically connected in various phases to a first group of alternating-current wiring metal segments extending from the terminal block 72. Likewise, positive-electrode diodes 92u, 92v, 92w have anode electrode leads electrically connected in various phases to a second group of alternating-current wiring metal segments extending from the terminal block 72.

The stator coil 16a includes stator leads 16b in various phases which extend through the tubular portion 72b and have rear ends electrically connected to a third group of alternating-current wiring metal segments extending from the terminal block 72.

The negative-side cooling fin 70 is connected to ground and an output terminal 94 is fixedly secured to the positive-side cooling fin 74.

With the vehicle alternator 10 of the present embodiment, while the negative-side cooling fin 70 and the positive-side cooling fin 74 are comprised of aluminum diecasted bodies, these component parts may be preferably formed by press-formed aluminum plates.

As shown in FIG. 2, the negative-side cooling fin 70 and positive-side cooling fin 74 are placed in radiated places. In addition, the positive-side cooling fin 74 has a smaller diameter than that of the negative-side cooling fin 70. The positive-side cooling fin 74 has a circumferentially extending flat plate section 74d placed radially inside the negative-side cooling fin 70, and a large number of radially extending rib portions 74e that axially protrude toward the end cover 30 from the flat plate section 74d. The rib portions 74e are formed in radially straight configurations, respectively, as shown in FIG. 2. However, the present invention is not limited to such particular shapes and may take any other suitable shapes depending on needs.

Further, the rib portions 74e are formed on the flat plate section 74d in areas away from the positive-electrode diodes 90, fitted to the flat plate section 74d, and coupling areas in which the diodes are coupled to the flat plate section 74d.

(End Cover 30)

The end cover 30 is formed in a substantially bowl-shaped flat-bottomed member by resin-forming. The end cover 30 has a bottom wall 30a formed with a large number of cooling air flow inlet windows 30b for admitting cooling airflows in a direction as shown by an arrow A1 in FIG. 3.

(Heat Shield Plate Portion 72a and Heat Shield Plate Portion 30c)

A heat shield plate portion 72a and heat shield plate portion 30c are described below in detail with reference to FIGS. 1 and 3.

The heat shield plate portion 72a is made of resin and integrally formed with the terminal block 72. Likewise, the heat shield plate portion 30c is made of resin and integrally formed with the end cover 30.

More particularly, the terminal block 72 has a radially inward end portion 72b from which the heat shield plate portion 72a extends in a substantially axial direction toward the end cover 30 through a radial space between an outer periphery of the positive-side cooling fin 74 and the bottom wall 62b of the sealing plate 62. That is, the heat shield plate portion 72a takes the form of a circular cylinder, extending in a slightly inclined angle with respect to an axis of the rotary shaft 20, which is cut away in an area overlapping with the brush unit 26 in a cleaved cylindrical structure.

The heat shield plate portion 30c axially extends from the bottom wall 30a of the end cover 30 toward the terminal block 72 in an area radially outward the heat shield plate portion 72a through the radial space between the outer periphery of the positive-side cooling fin 74 and the bottom wall 62b of the sealing plate 62. The heat shield plate portion 30c has a guide slope 30d for guiding the cooling airflow in a manner as described below. In addition, the heat shield plate portion 30c takes the form of a circular cylinder that is cut away in an area overlapping with the brush unit 26 in a cleaved cylindrical structure.

With the present embodiment, both the heat shield plate portions 72a and 30c are interposed between the rib portions 74e, formed on the positive-side cooling fin 74 at a radially inward end thereof, and the bottom wall 62b of the sealing plate 62.

The heat shield plate portions 72a and 30c overlap each other in a radial direction with a function to deflect the cooling airflow in a manner described below: That is, the cooling airflow, drawn through the cooling airflow windows 30b, passes through a cooling air flow passage 82 defined in the form of a radial space between the heat shield plate portion 30c and the rib portions 74e of positive-side cooling fin 74, is caused to deflect in a direction as shown by an arrow A2 by the action of the heat shield plate portion 72a. When this takes place, the cooling airflow A2 impinges upon a wall surface of the bottom wall 30a of the end cover 30. Then, the cooling airflow flows through a radial space between the bottom wall 62b of the shielding plate 62 and the heat shield plate portion 72a in a direction as shown by an arrow A3. Thereafter, the cooling airflow impinge upon an end wall member 15 held in abutting engagement with the rear frame 14 and deflected in a direction as shown by an arrow A4, after which the cooling airflow is discharged to the outside of the rear frame 14 in a direction as shown by an arrow A4 in FIG. 1. Thus, the heat shield plate portions 72a and 30c form a cooling airflow passage in a labyrinth sealing structure provided in an area near an outer circumferential periphery of the sealing plate 62.

With such a structure mentioned above, the brush unit 26 is favorably heat shielded from the positive-side cooling fin 74 acting as a heat shield plate member with increased waterproof function, while enabling the cooling airflow to ensure increased cooling effects of the relevant component parts.

Second Embodiment

A vehicle alternator of a second embodiment according to the present invention will be described below with reference to FIG. 4.

Figure 4:
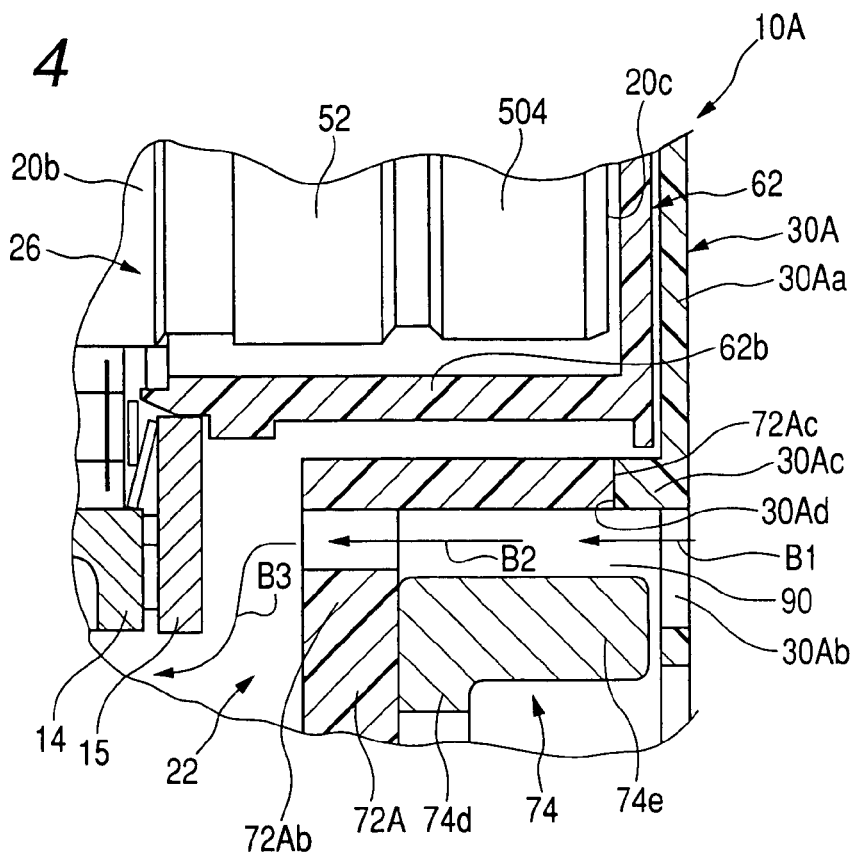
FIG. 4 is a fragmentary enlarged view showing an insulating terminal block and an end cover with featured structures of a second embodiment according to the present invention.

With the vehicle alternator 10A shown in FIG. 4, a heat shield plate portion 72Aa is integrally formed with a terminal block 72A at a radially inward end 72Ab thereof and extends in a direction substantially parallel to the bottom wall 62b of the shielding plate 62. An end cover 30A has a bottom wall 30Aa formed with a heat shield plate portion 30Ac, axially extending in a direction substantially parallel to the bottom wall 62b of the shielding plate 62 such that a front end face 30Ad of the heat shield plate portion 30Ac is brought into abutting contact with a rear end face 72Ac of the heat shield plate portion 72Aa.

Such a structure provides an axially extending cooling airflow passage 90 in an area close proximity to the ribs 74e of the positive-side rib portions 74e to cool the same. In addition, the terminal block 72A has a radially inward end 72Ab formed with a laterally extending through-bore 72Ad that plays a role as a cooling air inlet. Thus, a cooling air flow is admitted through a large number of cooling airflow windows 30Ab formed in the end cover 30 in a direction as shown by an arrow B1 to pass through the cooling airflow passage 90 in a direction as shown by an arrow B2. Then, the cooling airflow passes through the through-bore 72Ad formed in the terminal block 72A and discharged in a direction as shown by an arrow B3 in FIG. 4.

(First Modified Form)

In place of causing an outer peripheral surface of the heat shield plate portion 72Aa to be brought into tight contact with an inner peripheral surface of the heat shield plate portion 80Ac, the heat shield plate portion 72Aa of the terminal block 72A may be omitted or shortened in length and the heat shield plate portion 30Ac may be configured to axially extend frontward to be brought into tight contact with the terminal block 72A.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A vehicle alternator comprising:
a stator having a stator winding;
a rotor having a field winding;
a rotary shaft to which the rotor is fixedly mounted and carrying thereon slip rings;
a frame surrounding the stator and the rotor;
a bowl-shaped end cover covering an end face of the frame and defining an electric component-part compartment together with the end face of the frame for accommodating the slip rings carried on the rotary shaft;
a brush unit held in sliding contact with the slip rings in the electric component-part compartment; and
a rectifier unit accommodated in the electric component-part compartment on a radial plane in opposition to the brush unit with respect to an axis of the rotary shaft;
the rectifier unit including:
an insulating terminal block radially extending in face-to-face relation to the one end face of the frame;
a positive-side cooling fin carried on one surface of the insulating terminal block; and
a negative-side cooling fin carried on the other surface of the insulating terminal block;
wherein at least one of the insulating terminal block and the end cover has a heat shield plate member laterally extending through a radial space between the cooling fins and the brush unit in a direction substantially parallel to the axis of the rotary shaft; and
wherein the heat shield plate member includes first and second heat shield plate portions provided on the insulating terminal block and the end cover, respectively; and
the first and second heat shield plate portions laterally extend in an overlapped relationship with a given radial space.

2. The vehicle alternator according to claim 1, wherein:
the first heat shield plate portion is placed in an area between one of the cooling fins and the brush unit and extends from the insulating terminal block in the direction substantially parallel to the axis of the rotary shaft; and
the second heat shield plate portion is placed in the area between the one of the cooling fins and the brush unit so as to extend from the end cover in a position radially outward the first heat shield plate portion of the insulating terminal block.

3. A vehicle alternator comprising:
a stator having a stator winding;
a rotor having a field winding;
a rotary shaft to which the rotor is fixedly mounted and carrying thereon slip rings;
a frame surrounding the stator and the rotor;
a bowl-shaped end cover covering an end face of the frame and defining an electric component-part compartment together with the end face of the frame for accommodating the slip rings carried on the rotary shaft;
a brush unit held in sliding contact with the slip rings in the electric component-part compartment; and
a rectifier unit accommodated in the electric component-part compartment on a radial plane in opposition to the brush unit with respect to an axis of the rotary shaft;
the rectifier unit including:
an insulating terminal block radially extending in face-to-face relation to the one end face of the frame;
a positive-side cooling fin carried on one surface of the insulating terminal block; and
a negative-side cooling fin carried on the other surface of the insulating terminal block;
wherein at least one of the insulating terminal block and the end cover has a heat shield plate member laterally extending through a radial space between the cooling fins and the brush unit in a direction substantially parallel to the axis of the rotary shaft; and
wherein the end cover has a plurality of cooling airflow windows;
the electric component-part compartment has a cooling airflow passage in fluid communication with the cooling airflow windows to admit cooling airflows from the cooling airflow windows in contact with the cooling fins;
the heat shield plate member includes first and second heat shield plate portions provided on the insulating terminal block and the end cover, respectively;
the first and second heat shield plate portions laterally extend in an overlapped relationship with a given radial space;
the first heat shield plate portion is placed in an area between one of the cooling fins and the brush unit and extends from the insulating terminal block in the direction substantially parallel to the axis of the rotary shaft; and
the second heat shield plate portion is placed in the area between the one of the cooling fins and the brush unit so as to extend from the end cover in a position radially outward the first heat shield plate portion of the insulating terminal block.

4. A vehicle alternator comprising:
a stator having a stator winding;
a rotor having a field winding;
a rotary shaft to which the rotor is fixedly mounted and carrying thereon slip rings;
a frame surrounding the stator and the rotor;
a bowl-shaped end cover covering an end face of the frame and defining an electric component-part compartment together with the end face of the frame for accommodating the slip rings carried on the rotary shaft;
a brush unit held in sliding contact with the slip rings in the electric component-part compartment; and
a rectifier unit accommodated in the electric component-part compartment on a radial plane in opposition to the brush unit with respect to an axis of the rotary shaft;
the rectifier unit including:
an insulating terminal block radially extending in face-to-face relation to the one end face of the frame;
a positive-side cooling fin carried on one surface of the insulating terminal block; and
a negative-side cooling fin carried on the other surface of the insulating terminal block;
wherein at least one of the insulating terminal block and the end cover has a heat shield plate member laterally extending through a radial space between the cooling fins and the brush unit in a direction substantially parallel to the axis of the rotary shaft; and
wherein the heat shield plate member includes first and second heat shield plate portions extending from the insulating terminal block and the end cover, respectively; and
the first and second heat shield plate portions laterally extend in an overlapping relationship with a given radial space;
wherein the first and second heat shield plate portions are radially spaced from the cooling fins to define a cooling airflow passage along the cooling fins.

5. A vehicle alternator comprising:
a stator having a stator winding;
a rotor having a field winding;
a rotary shaft to which the rotor is fixedly mounted and carrying thereon slip rings;
a frame surrounding the stator and the rotor;
a bowl-shaped end cover covering an end face of the frame and defining an electric component-part compartment together with the end face of the frame for accommodating the slip rings carried on the rotary shaft;
a brush unit held in sliding contact with the slip rings in the electric component-part compartment; and
a rectifier unit accommodated in the electric component-part compartment on a radial plane in opposition to the brush unit with respect to an axis of the rotary shaft;
the rectifier unit including:
an insulating terminal block radially extending in face-to-face relation to the one end face of the frame;
a positive-side cooling fin carried on one surface of the insulating terminal block; and
a negative-side cooling fin carried on the other surface of the insulating terminal block;
wherein at least one of the insulating terminal block and the end cover has a heat shield plate member laterally extending through a radial space between the cooling fins and the brush unit in a direction substantially parallel to the axis of the rotary shaft; and
wherein the heat shield plate member includes first and second heat shield plate portions laterally extending from the insulating terminal block and the end cover, respectively, in opposition to each other in the direction parallel to the axis of the rotary shaft at a position in the vicinity of the cooling fins; and
the first and second heat shield plate portions have end faces held in abutting contact with each other to define a cooling airflow passage along the cooling fins.

* * * * *